United States Patent [19]
Ushijima et al.

[11] Patent Number: 4,881,785
[45] Date of Patent: Nov. 21, 1989

[54] ANTI-LOCK BRAKE CONTROL METHOD AND SYSTEM FOR MOTOR VEHICLES

[75] Inventors: Takayaki Ushijima; Katsumasa Igarashi; Seiichi Ishizeki, all of Tokyo, Japan

[73] Assignee: Fuji Jukogyo Kabushiki Kaisha, Tokyo, Japan

[21] Appl. No.: 308,135

[22] Filed: Feb. 9, 1989

[30] Foreign Application Priority Data

Feb. 9, 1988 [JP] Japan .................... 63-27946

[51] Int. Cl.$^4$ ............................... B60T 8/84
[52] U.S. Cl. .................................. 303/111; 180/197; 303/100; 303/110
[58] Field of Search ................. 180/197; 188/112 A; 303/94, 95, 96, 100, 103, 106, 110, 111; 364/426.02, 426.03

[56] References Cited

U.S. PATENT DOCUMENTS

| 4,374,421 | 2/1983 | Leiber | 303/111 X |
| 4,593,955 | 6/1986 | Leiber | 303/106 |
| 4,717,209 | 1/1988 | Hagiya et al. | 303/111 |

*Primary Examiner*—Duane A. Reger
*Attorney, Agent, or Firm*—Beveridge, DeGrandi & Weilacher

[57] ABSTRACT

In anti-lock brake control of motor vehicles wherein the control of braking hydraulic pressure for braking the wheels is accomplished by repeating a control pattern in which during braking the braking hydraulic pressure is reduced and then increased in response to variations of a control speed selected from a wheel, detection means for detecting a lateral acceleration of the vehicle body is provided. When detection means detects lateral acceleration while the vehicle is braked, thereby detecting J-turn braking, a higher one of the wheel speeds of the left and right rear wheels is selected, and a lower one of the wheel speeds of the two wheels connected to one diagonally disposed hydraulic line to which the rear wheel whose speed is selected belongs is selected as a control speed to be applied to the one hydraulic line, while the wheel speed of the front wheel connected to the other hydraulic line is selected as a control speed to be applied to the other hydraulic line, whereby the wheel speed information of the floating inner rear wheel is neglected and the wheel speed information of the outer front wheel is taken as a control speed.

4 Claims, 3 Drawing Sheets

ANTI-LOCK BRAKE CONTROL METHOD AND SYSTEM FOR MOTOR VEHICLES

BACKGROUND OF THE INVENTION

The present invention relates to an anti-lock brake control method and system for motor vehicles.

In hydraulic brake systems for motor vehicles, there have been devised and demonstrated various anti-lock brake devices. For example, during the braking operation, when a brake pedal is depressed to cause the hydraulic pressure to be transmitted from a master cylinder to wheel cylinders, the rate of decrease in wheel speeds with respect to the vehicle speed or the drop in the wheel speeds with respect to the vehicle speed is detected, and the increase and decrease in the braking hydraulic pressure to be supplied to the wheel cylinders are alternately controlled in such a manner that the brake can be applied effectively without locking of the wheels, so that the driver can steer the motor vehicle in a desired direction. For instance, such anti-lock brake device is disclosed in Japanese Pat. Application Laid-Open Publication (Kokai) No. 60-61354 published April 9, 1985.

As described above, the conventional anti-lock brake devices employ a control system which repeats a control pattern that the wheel speeds with respect to the vehicle speed are decreased by increasing the hydraulic pressure transmitted to the wheel cylinders and then relieving the hydraulic pressure to wait for the recovery of the wheel speeds due to the reaction forces from the surface of the road, before increasing the hydraulic pressure again. Therefore, when the brakes are suddenly applied immediately after sudden steering in one direction (to be called "J-turn breaking" in general) so that the inner wheels rise up and the reaction forces from the surface of the road decreases as consequence, the braking force is adjusted to encounter such phenomenon to thereby prevent the wheels from locking. As a result, the braking force is unavoidably decreased. The above-described problem considerably adversely affects brake systems of the type wherein the hydraulic lines are arranged diagonally to cross each other and wherein the braking hydraulic pressures transmitted to the wheel cylinders of wheels are controlled in response to the lower wheel speed.

SUMMARY OF THE INVENTION

In view of the above, the primary object of the present invention is to provide an anti-lock brake control method and system which can prevent decrease in the braking force even during J-turn braking.

In order to attain the above and other objects, the present invention provides, in one aspect thereof, an anti-lock brake control method for a motor vehicle having an anti-lock brake control system which has a diagonally disposed dual hydraulic line system and which accomplishes the control of braking hydraulic pressure for braking the wheels of the vehicle, by repeating a control pattern in which during braking the lower one of the wheel speeds of the two wheels connected to the same hydraulic line is selected as a control speed and in which, in response to variations of said control speed, the braking hydraulic pressure in the same hydraulic line is reduced and then increased, said method being characterized by the steps of: providing detecting means for detecting a J-turn braking state of the vehicle; selecting a higher one of the wheel speeds of left and right rear wheels when said detecting means detects a J-turn braking; selecting a lower one of the wheel speeds of two wheels connected to one hydraulic line to which the rear wheel having said selected higher wheel speed belongs, as a control speed to be applied to said one hydraulic line; selecting the wheel speed of a front wheel connected to the other hydraulic line as a control speed to be applied to said other hydraulic line; and controlling the braking hydraulic pressures in accordance with the selected speeds, when the detection means detects the J-turn braking state, in order to stop the vehicle without skidding in a predetermined pattern.

The present invention provides, in another aspect thereof, an anti-lock brake control system for a motor vehicle, comprising a dual hydraulic line system having two diagonally disposed hydraulic lines for braking wheels of the vehicle, and means for carrying out the control of braking hydraulic pressure within the hydraulic lines, by repeating a control pattern in which during braking the lower one of the wheel speeds of the two wheels connected to any one of the hydraulic lines is selected as a control speed to be applied to that hydraulic line and in which, in response to variations of the control speed, the braking hydraulic pressure is reduced and then increased, said control system being characterized by: means for detecting a J-turn braking state of the vehicle; means for selecting a higher one of the wheel speeds of left and right rear wheels and delivering the selected higher wheel speed as an output; means for selecting a lower one of the wheel speeds of two wheels connected to one hydraulic line to which one rear wheel whose speed is selected belongs, as a control speed to be applied to said one hydraulic line; and means for selecting the wheel speed of a front wheel connected to the other of the hydraulic lines as a control speed to be applied to said other hydraulic line; said means for carrying out the control having means for controlling the braking hydraulic pressures in accordance with the selected speeds when the detection means detects the J-turn braking state.

According to the present invention, the wheel speed information of the inner rear wheel which tends to rise up most due to the difference in locus of path between the inner and outer wheels and due to the displacement of the load when the motor vehicle is turned in a J-turn braking state, is neglected. Furthermore, in the hydraulic line to which the inner rear wheel belongs, the braking hydraulic pressure control is carried out in response to the wheel speed information of the outer front wheel which can produce the highest braking force among the four wheels. As a result, the decrease in braking force in the J-turn braking state can be prevented.

DESCRIPTION OF THE PREFERRED EMBODIMENT

Referring now to the accompanying drawings, a preferred embodiment of the present invention will be described in more detail.

Figure 1:
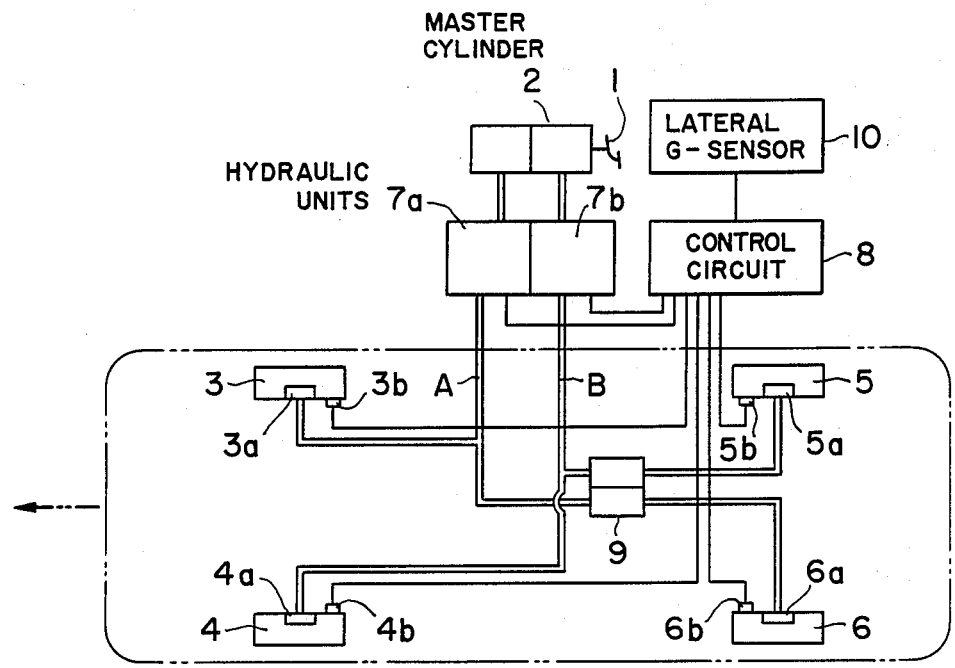
FIG. 1 is a diagram illustrating a braking hydraulic pressure system with a control system of the present invention.

Referring first to FIG. 1, reference numeral 1 represents a brake pedal operatively connected to a master cylinder 2. When the brake pedal 1 is depressed, the master cylinder 2 is activated so that the braking hydraulic pressure is transmitted through one hydraulic line A of a diagonal or crossed hydraulic line system to a brake device 3a for a right front wheel 3 and to a brake device 6a for a left rear wheel 6, while the braking hydraulic pressure is simultaneously transmitted through the other hydraulic line B to a brake device 4a for a left front wheel 4 and to a brake device 5a for a right rear wheel 5.

Inserted into both of the hydraulic lines A and B are hydraulic units 7a and 7b for controlling the pressure of the brake fluid which are controlled by brake fluid pressure increase signals and brake fluid pressure decrease signals generated by a control circuit 8 in response to wheel speed signals obtained from speed sensors 3b and 4b for the front wheels 3 and 4, respectively, and from speed sensors 5b and 6b for the rear wheels 5 and 6, respectively.

More particularly, the control circuit 8 is designed and constructed as follows: When the wheel speed signals are obtained from the speed sensors 3b and 6b for the wheels, which are connected to the same hydraulic line A, the lower value of these two speed signals (to be referred to as "the select-low signal" hereinafter in this specification) is selected as a speed control signal. When the deceleration of the wheel speed control signal becomes higher than a predetermined value, the control circuit 8 delivers a signal to the hydraulic unit 7a to interrupt the braking hydraulic pressure from the master cylinder 2 to the brake devices 3a and 6a and to maintain the braking hydraulic pressure at the same level.

Figure 4:
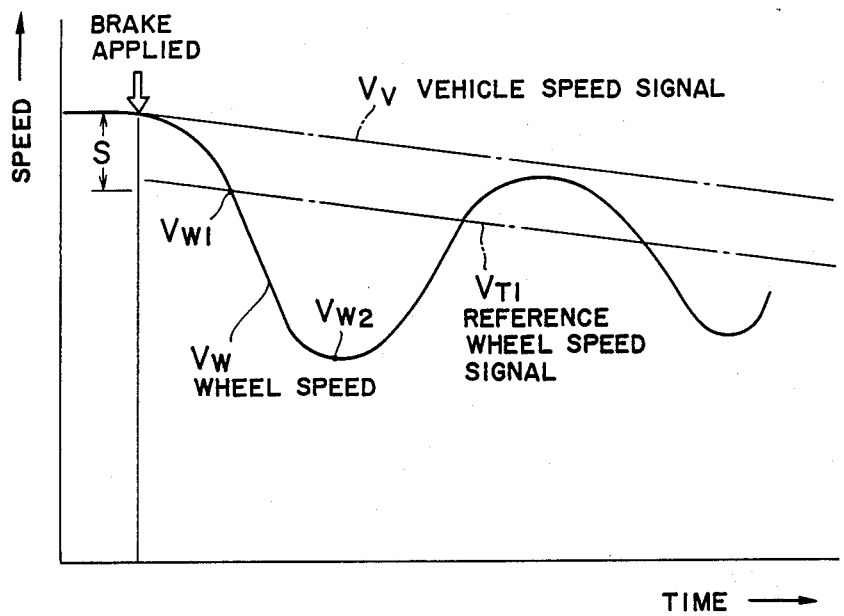
FIG. 4 is a graph explanatory of the control of the wheel speed.

As shown in FIG. 4, vehicle speed signal $V_v$ is set to have an initial value corresponding to the wheel speed $V_w$ at which the brake is applied. The vehicle speed signal $V_v$ decreases with a predetermined deceleration of, for example, $-1.1G$. A reference wheel speed signal $V_{T1}$ is set to maintain a value smaller than the vehicle speed signal $V_v$ by a predetermined value S, which is for instance 5 Km/h.

When the value $V_w$ of the select-low speed signal becomes lower than the value $V_{w1}$ of the reference wheel speed signal $V_{T1}$ as a result of the braking, the braking hydraulic pressures in both of the brake devices 3a and 6a are released. The deceleration of the wheel speed signal becomes zero or a low peak value $V_{w2}$ after the release of the above-mentioned braking hydraulic pressure, and the wheel speed increases. Then, release of the hydraulic pressure is stopped so that the braking hydraulic pressure is maintained at a constant value. Thereafter, the wheel speed $V_w$ continues to increase to a value below a predetermined speed due to the frictional forces between the wheels and the surface of the road o the reaction forces from the surface of the road. The above predetermined value is, for instance, the value of the reference wheel speed signal $V_{T1}$. When the wheel speed $V_w$ recovers to 85% of the difference between the low peak value, $V_{w2}$ and the wheel speed $V_{w1}$ the braking hydraulic pressure is supplied stepwise. Thereafter, the above-described steps are repeated.

In a like manner, in response to the wheel speed signals delivered from the speed sensors 4b and 5b of the left front wheel 4 and the right rear wheel 5, respectively, the control circuit 8 generates a signal in response to which the hydraulic unit 7b inserted in the hydraulic line B is actuated.

Reference numeral 9 represents proportioning valves inserted in the hydraulic lines A and B, respectively. When the brake pedal 1 is depressed, the proportioning valves 9 control the braking hydraulic pressure applied to the rear brake devices 5a and 6a in such a way that the rate of increase in the braking hydraulic pressure applied to the rear brake devices 5a and 6b becomes lower than the rate of increase of the braking hydraulic pressure applied to the front brake devices 3a and 4b from a predetermined point of time during braking operation, so that the irregular rotations (that is, the phenomenon in which the rear portion of the motor vehicle swings) due to the locking of the rear wheels prior to the locking of the front wheels during the braking operation can be prevented.

Figure 3:
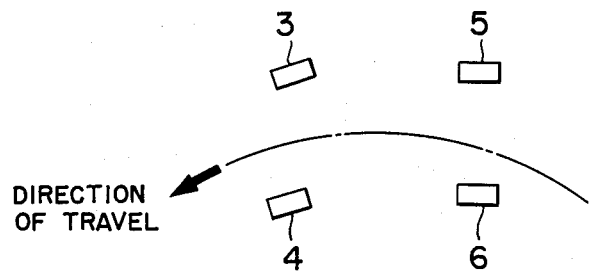
FIG. 3 illustrates a motor vehicle which is turning in the direction indicated by the arrow.

In the anti-lock brake system of the type described above, a crossed hydraulic line system or diagonal two-channel type hydraulic line system is used. Furthermore, as described above, of the wheel speeds obtained by the speed sensors of the wheels connected to the same hydraulic line, the wheel speed signal selected as the select-low signal is used as the control signal, in response to which the braking hydraulic pressure supplied to the brake devices of the wheels connected to the same hydraulic line is variably controlled. In this type of the anti-lock brake system, when sudden steering and the sudden braking (to be referred to as "J-turn braking") occur simultaneously while the vehicle is running, the wheel speed signals from the wheel speed sensors of the inner wheels (for instance, the left front and rear wheels in the case of a left turn as shown in FIG. 3) are used as the control signal. It will be understood that the speeds of the inner wheels become smaller than those of the outer wheels due to the difference of locus of the path between the inner and outer wheels and that the reaction forces of the inner wheels against the surface of the road are decreased due to rolling. As a result, there arises the problems that the timing of the pressure decrease of the braking hydraulic pressure supplied to the outer wheels (the right front and rear wheels in the case of the left turn) is advanced and that the timing of reincreasing the hydraulic pressure is delayed so that only an insufficient braking force can be obtained. However, almost all the braking operation must be carried out by the outer wheels.

To solve these problems, the conventional anti-lock braking system with the above-described construction is modified, according to the present invention, as shown in FIG. 1. That is, the braking system is provided with a transverse or lateral acceleration sensor or G-sensor 10 which detects a transverse or lateral acceleration acting on the motor vehicle. When the transverse or lateral acceleration detected by the G-sensor 10 is in excess of a predetermined value, for instance, higher than 0.6 G in the case of the J-turn, a signal is delivered from the G-sensor 10 to the control unit 8.

Figure 2:
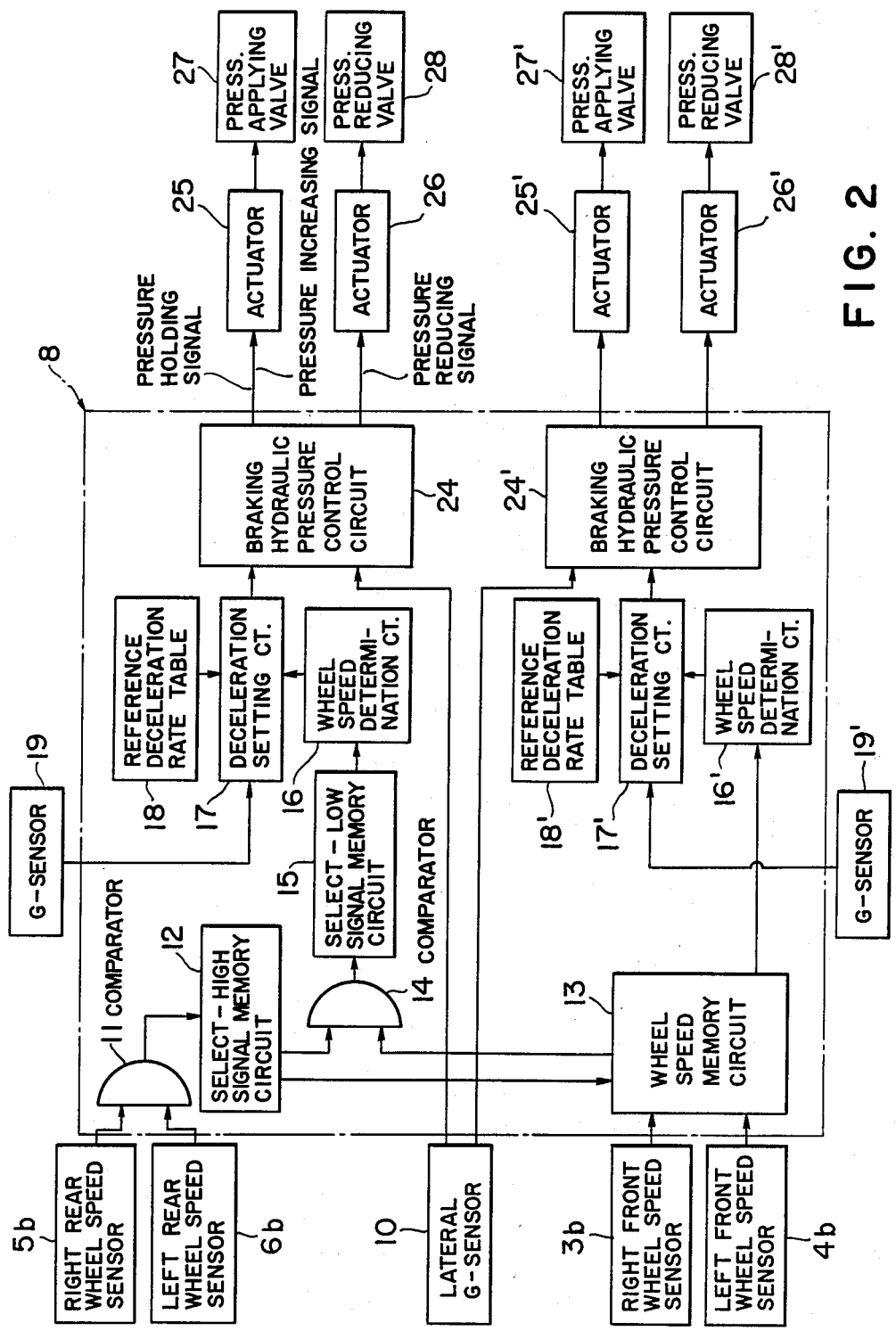
FIG. 2 is a block diagram showing the anti-lock brake control system in a J-turn mode according to the resent invention.

Referring to FIG. 2 showing details of the control circuit 8 in which components for the J-turn state control are shown, the signals of the wheel speeds detected by the wheel speed sensors 5b and 6b of the right rear wheel 5 and the left rear wheel 6 are supplied to a comparator 11 where a higher wheel speed is selected (which is referred to hereinafter as "select-high" wheel speed), and then inputted to a select-high memory circuit 12. On the other hand, the signals of the wheel speeds detected by the wheel speed sensors 3b and 4b of the right front wheel 3 and the left front wheel 4 are supplied to a wheel speed memory circuit 13, to which a signal of the selected rear wheel is also supplied from the select-high memory circuit 12. On the basis of the signal from the memory circuit 12, the wheel speed memory circuit 13 operates to select one of the wheel speed signals from the right and left front wheels 3 and 4 which belongs to the same hydraulic line A or B as the rear wheel from which the select-high wheel speed signal is selected. For example, in the J-turn braking state shown in FIG. 3, the wheel speed of the left front wheel speed sensor 4b is selected.

The select-high wheel speed signal is supplied from the select-high signal memory circuit 12 to a comparator 14 to which the front wheel speed signal selected as above is also provided. The comparator 14 operates to select a lower value of the two input signals (to be referred to as "select-low" signal) and to deliver the lower value as an output to a select-low signal memory circuit 15.

The output from the select-low signal memory circuit 15 is delivered to a wheel speed determination circuit 16 from which a wheel speed signal is provided to a deceleration setting circuit 17 in which the wheel speed signal is compared with a reference deceleration table 18 to thereby determine a constant to be multiplied with the value of the wheel speed signal. A front-rear direction G-sensor 19 supplies its output signal to the circuit 17. The value of the output control signal from the deceleration setting circuit 17 is thus determined and delivered to a braking hydraulic pressure control circuit 24, which is actuated by the signal from the lateral G-sensor 10 for changing the mode of the system.

Thus, pressure holding, increasing and/or reducing signals are delivered from the control circuit 24 to an actuator 25 or 26 to actuate a pressure applying valve 27 or a pressure reducing valve 28 of the hydraulic unit 7a or 7b (FIG. 1).

On the other hand, the front wheel speed signal other than the one provided to the comparator 14 (the right front wheel speed signal in the case of the J-turn braking shown in FIG. 3) is delivered from the wheel speed memory circuit 13 to a wheel speed determination circuit 16' and treated in a deceleration setting circuit 17' in the same manner as described in connection with the deceleration setting circuit 17, to be used as a control signal for the other braking hydraulic pressure control circuit 24' for the other hydraulic line.

The inner rear wheel tends to float most due to the difference in locus of pass between the inner and outer wheels and due to the displacement of the load when the brakes are applied. In the case of J-turn braking, the wheel speed signal of the inner rear wheel is neglected. Furthermore, in response to the wheel speed information of the outer front rear wheel which receives the highest braking force among the four wheels, the braking hydraulic pressure is controlled whereby the reduction in braking force during J-turn braking can be prevented.

So far, means for detecting J-turn braking has been described as the lateral G-sensor for detecting the acceleration transversely acting on the motor vehicle, but it is of course apparent that the transversely or laterally acting acceleration can be detected by computation based on the steering angle detected by a steering angle sensor and the motor vehicle body speed, by computation based on the difference in wheel speed between the inner and outer wheels or by a combination of the above-described computations.

As described above, according to the present invention, means for detecting J-turn braking is provided and when J-turn braking is detected by the detecting means, one of the left and right rear wheels, which has a higher speed, is selected and a lower one of the wheel speeds of the wheels connected to the hydraulic line to which said selected wheel belongs is selected as the control speed to be applied to the hydraulic line connected to the selected wheel, while the wheel speed of the front wheel of the other hydraulic line is selected as the control speed to be applied to the other hydraulic line. Therefore, in the case of J-turn braking, the wheel speed information of the most floating inner rear wheel can be neglected. On the other hand, in the hydraulic line to which said inner rear wheel belongs, the braking hydraulic control is carried out in response to the wheel speed information of the outer front wheel which receives the highest braking force among the four wheels. Therefore, the decrease in braking force due to the advanced timing of decreasing the pressure and the delayed timing of reincreasing the pressure can be prevented. Thus, the present invention can attain very advantageous effects in practice.

WHAT IS CLAIMED IS:

1. An anti-lock brake control method for a motor vehicle having an anti-lock brake control system which has a diagonally disposed dual hydraulic line system and which accomplishes the control of braking hydraulic pressure for braking the wheels of the vehicle, by repeating a control pattern in which during braking the lower one of the wheel speeds of the two wheels connected to the same hydraulic line is selected as a control speed and in which, in response to variations of said control speed, the braking hydraulic pressure in the same hydraulic line is reduced and then increased, said method comprising the steps of:
   providing detection means for detecting a J-turn braking state of the vehicle;
   selecting a higher one of the wheel speeds of left and right rear wheels when said detection means detects the J-turn braking;
   selecting a lower one of the wheel speeds of two wheels connected to one hydraulic line to which the rear wheel having said selected higher wheel speed belongs, as a control speed to be applied to said one hydraulic line;
   selecting the wheel speed of a front wheel connected to the other hydraulic line as a control speed to be applied to said other hydraulic line; and
   controlling the braking hydraulic pressures in accordance with the selected speeds, when the detection means detects the J-turn braking state, in order to stop the vehicle without skidding in a predetermined pattern.

2. An anti-lock brake control system for a motor vehicle, comprising a dual hydraulic line system having two diagonally disposed hydraulic lines for braking wheels of the vehicle, and means for carrying out the control of braking hydraulic pressure within the hydraulic lines, by repeating a control pattern in which during braking the lower one of the wheel speeds of the two wheels connected to any one of the hydraulic lines is selected as a control speed to be applied to that hydraulic line and in which, in response to variations of the control speed, the braking hydraulic pressure is reduced and then increased, said control system comprising:

means for detecting a J-turn braking state of the vehicle;

means for selecting a higher one of the wheel speeds of left and right rear wheels and delivering the selected higher wheel speed as an output;

means for selecting a lower one of the wheel speeds of two wheels connected to one hydraulic line to which one rear wheel whose speed is selected belongs, as a control speed to be applied to said one hydraulic line; and means for selecting the wheel speed of a front wheel connected to the other of the hydraulic lines as a control speed to be applied to said other hydraulic line, said means for carrying out the control having means for controlling the braking hydraulic pressures in accordance with said selected speeds when said detection means detects the J-turn braking state.

3. The anti-lock brake system according to claim 1, wherein said means for detecting a J-turn braking state is an acceleration sensor which detects a lateral acceleration acting on the vehicle.

4. The anti-lock brake system according to claim 3, wherein the acceleration sensor is connected to a braking hydraulic pressure control circuit forming a part of said means for carrying out the control.

* * * * *